(12) United States Patent
Rusch et al.

(10) Patent No.: US 9,664,081 B2
(45) Date of Patent: May 30, 2017

(54) ASSEMBLY AND METHOD FOR INTRODUCING A REDUCING AGENT INTO THE EXHAUST PIPE OF AN EXHAUST SYSTEM OF AN INTERNAL COMBUSTION ENGINE

(71) Applicant: Faurecia Emissions Control Technologies, Germany GmbH, Augsburg (DE)

(72) Inventors: Klaus Rusch, Gersthofen (DE); Rolf Kaiser, Augsburg (DE); Erich Forster, Grossaitingen (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 0 days.

(21) Appl. No.: 15/198,264

(22) Filed: Jun. 30, 2016

(65) Prior Publication Data

US 2016/0312677 A1 Oct. 27, 2016

Related U.S. Application Data

(63) Continuation of application No. 12/670,126, filed as application No. PCT/EP2008/005170 on Jun. 25, 2008.

(30) Foreign Application Priority Data

Jul. 24, 2007 (DE) .................... 10 2007 034 316
Feb. 4, 2008 (DE) .................... 20 2008 001 547 U

(51) Int. Cl.
*F01N 3/00* (2006.01)
*F01N 3/20* (2006.01)
(Continued)

(52) U.S. Cl.
CPC .......... *F01N 3/206* (2013.01); *F01N 3/2066* (2013.01); *F01N 3/2892* (2013.01); *F01N 13/08* (2013.01);
(Continued)

(58) Field of Classification Search
CPC ............... F01N 3/2066; F01N 2610/02; F01N 2610/08; F01N 2240/20
(Continued)

(56) References Cited

U.S. PATENT DOCUMENTS

| 1,462,219 A | 7/1923 | Wagner |
| 3,524,631 A | 8/1970 | Mare |

(Continued)

FOREIGN PATENT DOCUMENTS

| CN | 1370092 | 8/1999 |
| CN | 1448620 | 3/2002 |

(Continued)

OTHER PUBLICATIONS

International Preliminary Report on Patentability for PCT Application Serial No. PCT/EP2008/005170, dated Mar. 9, 2010, (6 pages).

(Continued)

*Primary Examiner* — Audrey K Bradley
*Assistant Examiner* — Anthony Ayala Delgado
(74) *Attorney, Agent, or Firm* — Barnes & Thornburg, LLP

(57) ABSTRACT

An assembly (10) for introducing a reducing agent into the exhaust pipe (12) of an exhaust system of an internal combustion engine, in particular of a motor vehicle, has a feed connector (14) which opens into the exhaust pipe (12) and includes a wall (16), a feed device (20) for reducing agents which opens into the feed connector (14), and a device (22) for generating a gas flow (G) which is additional to the reducing agent flow (R) and lines the wall (16) of the (Continued)

feed 10 connector (14). Furthermore, there is described a method of introducing a reducing agent into the exhaust pipe (12) of an exhaust system of an internal combustion engine, in particular of a motor vehicle.

20 Claims, 5 Drawing Sheets

(51) Int. Cl.
    *F01N 13/08*     (2010.01)
    *F01N 3/28*     (2006.01)

(52) U.S. Cl.
    CPC .............. *B01D 2251/206* (2013.01); *B01D 2251/2062* (2013.01); *B01D 2259/12* (2013.01); *F01N 2240/20* (2013.01); *F01N 2260/022* (2013.01); *F01N 2470/00* (2013.01); *F01N 2610/02* (2013.01); *F01N 2610/08* (2013.01); *F01N 2610/1453* (2013.01); *Y02T 10/24* (2013.01)

(58) Field of Classification Search
    USPC .......................................................... 60/286
    See application file for complete search history.

(56) References Cited

U.S. PATENT DOCUMENTS

| | | | |
|---|---|---|---|
| 4,094,934 A | 6/1978 | Tuckey | |
| 4,538,413 A | 9/1985 | Shinzawa | |
| 4,576,617 A | 3/1986 | Renevot | |
| 5,605,042 A | 2/1997 | Stutzenberger | |
| 5,606,856 A | 3/1997 | Linder | |
| 5,648,022 A | 7/1997 | Gohara | |
| 5,826,428 A | 10/1998 | Blaschke | |
| 6,192,677 B1 | 2/2001 | Tost | |
| 6,460,340 B1 | 10/2002 | Chauvette | |
| 6,513,323 B1 | 2/2003 | Weigl | |
| 6,516,610 B2 | 2/2003 | Hodgson | |
| 6,539,708 B1 | 4/2003 | Hofmann | |
| 6,637,196 B1 | 10/2003 | Tost | |
| 6,722,123 B2 | 4/2004 | Liu | |
| 6,755,014 B2 | 6/2004 | Kawai | |
| 7,448,206 B2 | 11/2008 | Meingast | |
| 7,509,799 B2 * | 3/2009 | Amou | B01D 53/9431 60/286 |
| 7,784,273 B2 | 8/2010 | Kanaya | |
| 7,992,379 B2 | 8/2011 | Suzuki | |
| 8,033,101 B2 | 10/2011 | Amon | |
| 8,079,211 B2 | 12/2011 | Levin | |
| 8,173,088 B2 | 5/2012 | Makartchouk | |
| 8,216,537 B2 | 7/2012 | Kouvetakis | |
| 8,438,839 B2 | 5/2013 | Floyd | |
| 8,607,550 B2 | 12/2013 | Tangemann | |
| 8,622,316 B2 | 1/2014 | Haeberer | |
| 8,726,643 B2 | 5/2014 | Way | |
| 8,800,276 B2 | 8/2014 | Levin | |
| 8,916,100 B2 | 12/2014 | Iijima | |
| 8,932,530 B2 | 1/2015 | Iijima | |
| 9,003,775 B2 | 4/2015 | Wright | |
| 9,180,407 B2 | 11/2015 | De Rudder | |
| 9,188,039 B2 | 11/2015 | Nagel | |
| 9,266,075 B2 | 2/2016 | Chapman | |
| 9,308,495 B2 | 4/2016 | Kimura | |
| 2002/0108368 A1 | 8/2002 | Hodgson | |
| 2003/0079467 A1 | 5/2003 | Liu | |
| 2003/0110763 A1 | 6/2003 | Pawson | |
| 2003/0182935 A1 | 10/2003 | Kawai | |
| 2003/0226412 A1 | 12/2003 | Rumminger | |
| 2006/0070374 A1 | 4/2006 | Gaiser | |
| 2006/0218902 A1 | 10/2006 | Arellano | |
| 2007/0092413 A1 | 4/2007 | Hirata | |
| 2007/0163241 A1 | 7/2007 | Meingast | |
| 2007/0193252 A1 | 8/2007 | McKinley | |
| 2008/0011777 A1 | 1/2008 | Cooke | |
| 2008/0011780 A1 | 1/2008 | Cooke | |
| 2008/0022663 A1 | 1/2008 | Dodge | |
| 2008/0022670 A1 | 1/2008 | Ichikawa | |
| 2008/0092526 A1 | 4/2008 | Kunkel | |
| 2008/0163612 A1 | 7/2008 | Gaiser | |
| 2008/0223022 A1 | 9/2008 | Amon | |
| 2008/0256931 A1 | 10/2008 | Kawakita | |
| 2008/0282687 A1 | 11/2008 | Park | |
| 2008/0295497 A1 | 12/2008 | Kornherr | |
| 2009/0019837 A1 | 1/2009 | Suzuki | |
| 2009/0019842 A1 | 1/2009 | Suzuki | |
| 2009/0019843 A1 | 1/2009 | Levin | |
| 2009/0044524 A1 | 2/2009 | Fujino | |
| 2009/0084094 A1 | 4/2009 | Goss | |
| 2009/0120066 A1 | 5/2009 | VanderGriend | |
| 2009/0127511 A1 | 5/2009 | Bruck | |
| 2009/0158717 A1 | 6/2009 | Kimura | |
| 2010/0005790 A1 | 1/2010 | Zhang | |
| 2010/0005791 A1 | 1/2010 | Ranganathan | |
| 2010/0071355 A1 | 3/2010 | Brown | |
| 2010/0083643 A1 | 4/2010 | Hayashi | |
| 2010/0101222 A1 | 4/2010 | Oesterle | |
| 2010/0107614 A1 | 5/2010 | Levin | |
| 2010/0186393 A1 | 7/2010 | Kowada | |
| 2010/0196225 A1 | 8/2010 | Harinath | |
| 2010/0212292 A1 | 8/2010 | Rusch | |
| 2010/0263359 A1 | 10/2010 | Haverkamp | |
| 2011/0036082 A1 | 2/2011 | Collinot | |
| 2011/0061374 A1 | 3/2011 | Noritake | |
| 2011/0079003 A1 | 4/2011 | Sun | |
| 2011/0088376 A1 | 4/2011 | Kowada | |
| 2011/0094206 A1 | 4/2011 | Liu | |
| 2011/0107743 A1 | 5/2011 | Ranganathan | |
| 2011/0113759 A1 | 5/2011 | Tilinski | |
| 2011/0126529 A1 | 6/2011 | Park | |
| 2011/0274590 A1 | 11/2011 | Floyd | |
| 2011/0308234 A1 | 12/2011 | De Rudder | |
| 2012/0020854 A1 | 1/2012 | Makartchouk | |
| 2012/0090305 A1 | 4/2012 | Floyd | |
| 2012/0174561 A1 | 7/2012 | Troxler | |
| 2012/0324872 A1 | 12/2012 | Jaruvatee | |
| 2013/0061577 A1 | 3/2013 | Floyd | |
| 2013/0152558 A1 | 6/2013 | Loman | |
| 2013/0164182 A1 | 6/2013 | Iijima | |
| 2013/0167516 A1 | 7/2013 | Loman | |
| 2013/0174537 A1 | 7/2013 | Loman | |
| 2013/0239546 A1 | 9/2013 | Levin | |
| 2013/0269325 A1 | 10/2013 | Hadden | |
| 2014/0079599 A1 | 3/2014 | Hill | |
| 2014/0196440 A1 | 7/2014 | Katou | |
| 2014/0196441 A1 | 7/2014 | Katou | |
| 2014/0196442 A1 | 7/2014 | Katou | |
| 2014/0196444 A1 | 7/2014 | Watahiki | |
| 2014/0311133 A1 | 10/2014 | Norling | |
| 2014/0334987 A1 | 11/2014 | Stanavich | |
| 2014/0334988 A1 | 11/2014 | Stanavich | |
| 2015/0040537 A1 | 2/2015 | Hicks | |
| 2015/0047329 A1 | 2/2015 | Way | |
| 2015/0071826 A1 | 3/2015 | Sampath | |
| 2015/0101313 A1 | 4/2015 | Mitchell | |
| 2015/0101318 A1 | 4/2015 | Munnannur | |
| 2015/0135683 A1 | 5/2015 | Petry | |
| 2015/0152766 A1 | 6/2015 | Brunel | |
| 2015/0167525 A1 | 6/2015 | Assalve | |
| 2015/0290585 A1 | 10/2015 | Nagata | |
| 2015/0361853 A1 | 12/2015 | Nagata | |
| 2016/0032808 A1 | 2/2016 | Kobe | |
| 2016/0184783 A1 | 6/2016 | Tyni | |

FOREIGN PATENT DOCUMENTS

| | | |
|---|---|---|
| DE | 19856366 C1 | 4/2000 |
| DE | 4417238 | 3/2003 |
| DE | 19806265 | 7/2004 |
| DE | 10248294 | 10/2005 |
| DE | 10306134 | 5/2006 |
| DE | 10312212 | 9/2006 |
| DE | 102006003786 | 4/2007 |

(56) References Cited

FOREIGN PATENT DOCUMENTS

| | | |
|---|---|---|
| DE | 102005061145 | 6/2007 |
| DE | 102005061145 A1 | 6/2007 |
| DE | 202007010324 | 11/2008 |
| DE | 102008023585 | 1/2009 |
| DE | 102008032109 | 1/2009 |
| DE | 102007051510 | 4/2009 |
| DE | 102007052262 | 5/2009 |
| DE | 202008001022 | 6/2009 |
| DE | 102008008563 | 8/2009 |
| DE | 102008008564 | 8/2009 |
| DE | 102008041486 | 2/2010 |
| DE | 102008059602 | 6/2010 |
| DE | 102009036511 | 2/2011 |
| DE | 102009046280 | 5/2011 |
| DE | 112009001055 | 7/2011 |
| DE | 102011008895 | 7/2012 |
| DE | 102008040476 | 4/2013 |
| DE | 102008052757 | 2/2014 |
| DE | 102008032110 | 2/2015 |
| DE | 102013012909 | 2/2015 |
| DE | 102014104224 | 10/2015 |
| DE | 10241697 | 5/2016 |
| EP | 0268026 | 8/1993 |
| EP | 0956895 | 11/1999 |
| EP | 1008732 | 3/2004 |
| EP | 1314864 | 1/2007 |
| EP | 2221459 | 8/2010 |
| EP | 2282026 | 2/2011 |
| EP | 2295755 | 3/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 1990513 | 9/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2965011 | 3/2012 |
| FR | 2977632 | 1/2013 |
| JP | H2223624 | 2/1989 |
| JP | H0296212 | 4/1990 |
| JP | 2005127271 | 5/2005 |
| JP | 2007000783 | 1/2007 |
| JP | 2007000784 | 1/2007 |
| JP | 2007146700 | 6/2007 |
| JP | 2008014213 | 1/2008 |
| JP | 2009030560 | 2/2009 |
| JP | 2009156068 | 7/2009 |
| JP | 2009156069 | 7/2009 |
| JP | 2009209822 | 9/2009 |
| JP | 2013002367 | 1/2013 |
| KR | 20090069237 | 6/2009 |
| KR | 20090105593 | 10/2009 |
| SE | 531199 | 1/2009 |
| WO | 9701387 | 1/1997 |
| WO | 0066885 | 11/2000 |
| WO | 2006123511 | 11/2006 |
| WO | 2007073957 | 7/2007 |
| WO | 2007115748 | 10/2007 |
| WO | 2008027146 | 3/2008 |
| WO | 2008034981 | 3/2008 |
| WO | 2008080695 | 7/2008 |
| WO | 2008122724 | 10/2008 |
| WO | 2009012859 | 1/2009 |
| WO | 2009012885 | 1/2009 |
| WO | 2009030858 | 3/2009 |
| WO | 2009068136 | 6/2009 |
| WO | 2009098096 | 8/2009 |
| WO | 2010055239 | 5/2010 |
| WO | 2010056793 | 5/2010 |
| WO | 2010078052 | 7/2010 |
| WO | 2010088208 | 8/2010 |
| WO | 2010149410 | 12/2010 |
| WO | 2011043993 | 4/2011 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012096971 | 7/2012 |
| WO | 2012120000 | 9/2012 |
| WO | 2013010700 | 1/2013 |
| WO | 2013035112 | 3/2013 |
| WO | 2013036406 | 3/2013 |
| WO | 2013048309 | 4/2013 |
| WO | 2013099312 | 7/2013 |
| WO | 2013099313 | 7/2013 |
| WO | 2013099314 | 7/2013 |
| WO | 2013112154 | 8/2013 |
| WO | 2013178321 | 12/2013 |
| WO | 2014017310 | 1/2014 |
| WO | 2014047091 | 3/2014 |
| WO | 2014051617 | 4/2014 |
| WO | 2014077023 | 5/2014 |
| WO | 2014112063 | 7/2014 |
| WO | 2014112067 | 7/2014 |
| WO | 2014112072 | 7/2014 |
| WO | 2014112073 | 7/2014 |
| WO | 2014115461 | 7/2014 |
| WO | 2014182832 | 11/2014 |
| WO | 2015018971 | 2/2015 |
| WO | 2015020820 | 2/2015 |
| WO | 2015074926 | 5/2015 |
| WO | 2015076765 | 5/2015 |
| WO | 2015130640 | 9/2015 |
| WO | 2015151282 | 10/2015 |
| WO | 2015187128 | 12/2015 |
| WO | 2016013319 | 1/2016 |

OTHER PUBLICATIONS

International Search Report for PCT International Application Serial No. PCT/EP2008/005170, completed Sep. 22, 2008, (4 pages).

* cited by examiner

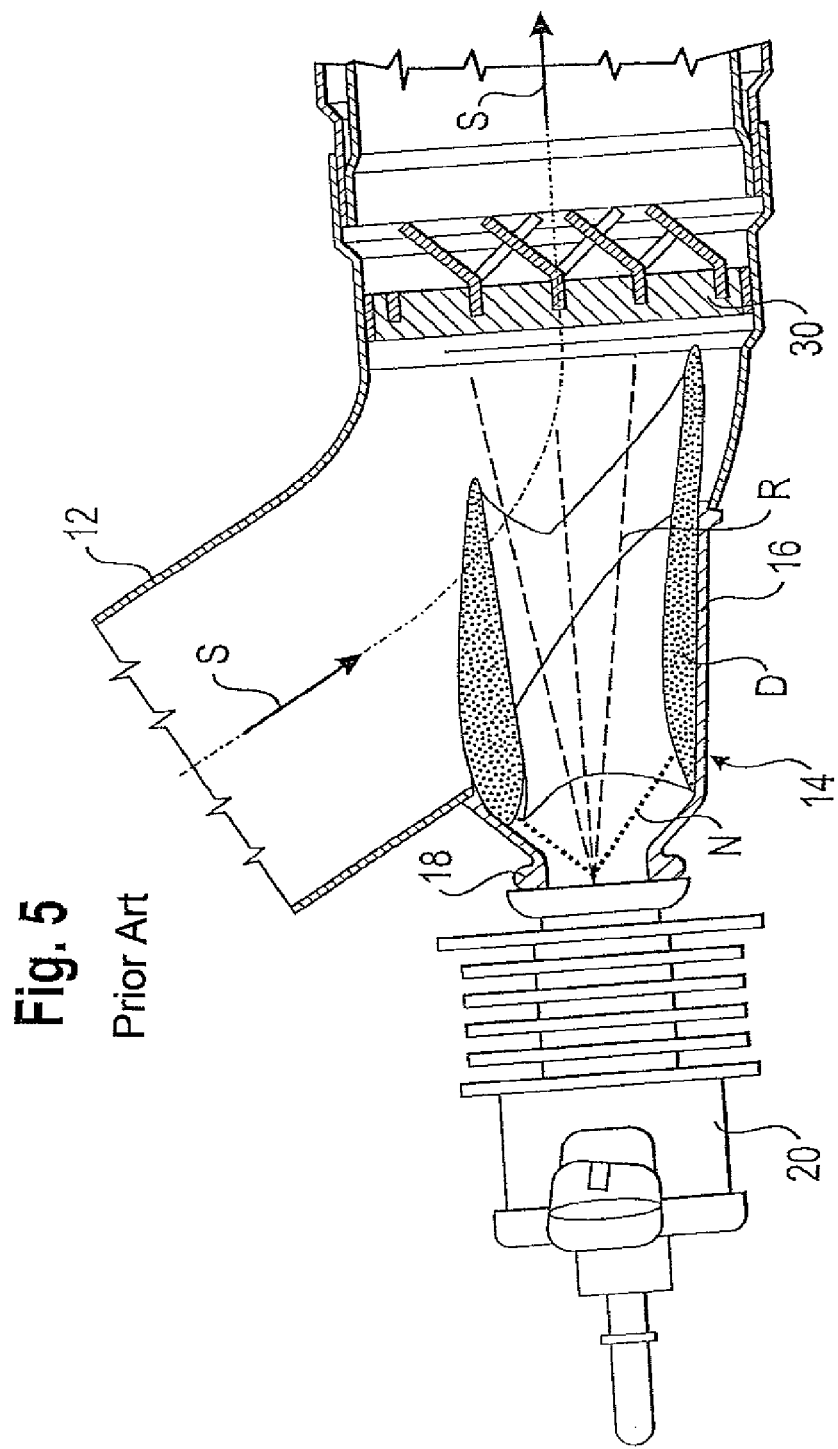

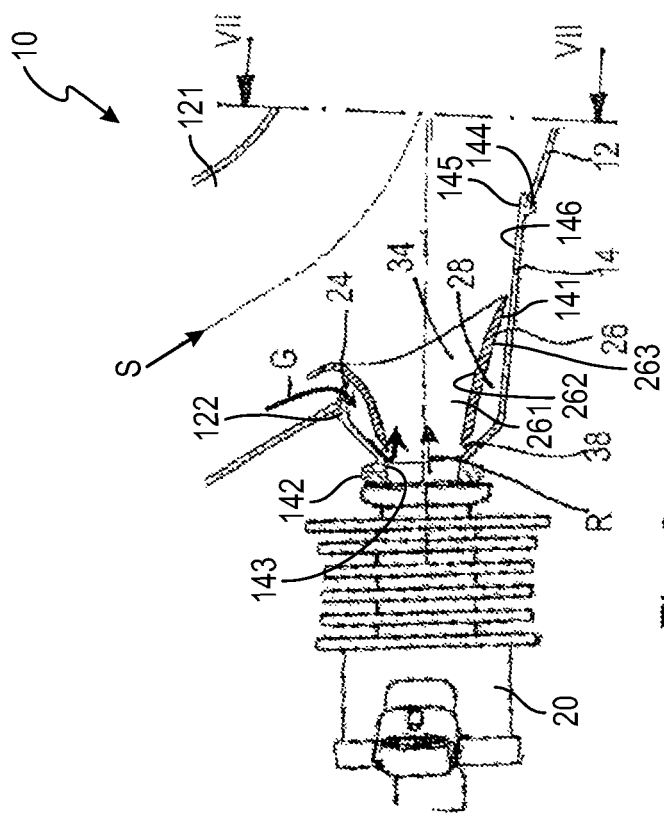

ASSEMBLY AND METHOD FOR INTRODUCING A REDUCING AGENT INTO THE EXHAUST PIPE OF AN EXHAUST SYSTEM OF AN INTERNAL COMBUSTION ENGINE

PRIORITY CLAIM

This application is a continuation of U.S. application Ser. No. 12/670,126 filed Apr. 27, 2010, which is a national stage entry under 35 USC §371(b) of PCT International Application No. PCT/EP2008/005170, filed Jun. 25, 2008, and claims the benefit of German Patent Application No. 102007034316.9, filed Jul. 24, 2007, and of German Patent Application No. 202008001547.2, filed Feb. 4, 2008, each of which are expressly incorporated by reference herein.

BACKGROUND

The present invention relates to an assembly for introducing a reducing agent into the exhaust pipe of an exhaust system of an Internal combustion engine, in particular of a motor vehicle. The present invention further relates to a method of introducing a reducing agent into the exhaust pipe of an exhaust system of an internal combustion engine, in particular of a motor vehicle.

To comply with specifications relating to environmental laws, exhaust gases such as those of motor vehicles driven by internal combustion engines need to be subjected to a purification. In particular, for nitrogen oxide reduction, so-called SCR catalytic converters (also referred to as denitrification catalysts) are increasingly employed, which selectively reduce nitrogen oxides (NOx) generated in the engine during combustion to form water and nitrogen with the aid of ammonia ($NH_3$) intermediately stored in the SCR catalytic converter. The provision of the ammonia required for the selective catalytic reduction is effected by a hydrolysis of urea which is added to the exhaust gas usually in a dissolved form.

Systems known from the prior art utilize an injection valve, for example a low pressure fuel Injection valve, to introduce an aqueous urea solution into the exhaust pipe upstream of an SCR catalytic converter. Such valves produce a fine mist of urea in the region of the valve tip which may deposit on the wall of the exhaust pipe. This is a problem in particular in the low-load, low-temperature operation of the internal combustion engine, in which the deposits are not vaporized again and may completely block the exhaust pipe in this way.

SUMMARY

The present invention provides an assembly and a method for introducing a reducing agent into the exhaust pipe of an exhaust system of an internal combustion engine, which allow urea deposits to be avoided or at least greatly reduced.

In accordance with the invention, this is achieved by an assembly of the type initially mentioned, having a feed connector which opens into the exhaust pipe and includes a wall, a feed device for reducing agents which opens Into the feed connector, and a device for generating a gas flow which is additional to the reducing agent flow and lines the wall of the feed connector. This additional gas flow (which is also different from the main exhaust gas flow in the exhaust pipe) is at least largely free of reducing agent and prevents any mist produced upon injection of a reducing agent from depositing on the walls of both the feed connector and the exhaust pipe.

The additional gas flow may be fresh air, in particular compressed air. To this end, a compressed air pipe available in the vehicle is preferably made use of for supplying the device.

Alternatively or additionally, the additional gas flow may be exhaust gas which is branched off from the main exhaust gas flow preferably upstream of a turbocharger, as a result of which a desirable increased pressure is available in the exhaust gas.

According to a preferred embodiment of the invention, the device includes an inlet opening for the gas flow, which is in fluid communication with, e.g., a fresh air duct or with the exhaust pipe.

The inlet opening may be arranged in the wall of the feed connector. It is also possible for the inlet opening to be formed in the region of the orifice of the feed connector into the exhaust pipe. Preferably, the inlet opening is then situated on the side of the orifice that is upstream with respect to the exhaust gas flow, that is, part of the exhaust gas flow from the exhaust pipe flows through the inlet opening into the region of the orifice of the feed connector. According to a further development of the invention, the device includes a guide member which is arranged in the feed connector to dictate the desired direction for the additional gas flow.

Preferably, the guide member extends from the feed device at least partially along the wall of the feed connector. In the region of the feed device or a mount for the feed device, the guide member more particularly rests directly against the wall. This prevents any reducing agent from reaching an area between the guide member and the wall.

The guide member may line the wall of the feed connector, a gap being formed at least in sections between the wall and the guide member. Preferably, both the wall and the guide member are of a conical shape, the wall having the larger opening angle towards the orifice. In this way, a gap that becomes increasingly larger is produced towards the orifice of the feed connector; the additional gas flow is conducted through this gap.

According to one embodiment of the invention, the guide member projects at least partially into the exhaust pipe. The guide member is made to be particularly long here and additionally serves as a wall that is heated by the gas flow and causes a vaporization of any deposits. As an alternative, the guide member may also be configured to be very short and serve exclusively for steering the gas flow.

Advantageously, a section of the guide member extends into the exhaust pipe on the side of the orifice that is upstream with respect to the exhaust gas flow. As already mentioned above, an inlet opening is formed in this way, which directs part of the exhaust gas flow into the feed connector to form the additional gas flow. Alternatively or additionally, it is, of course, also possible for a section of the guide member to extend into the exhaust pipe on the side of the orifice that is downstream with respect to the exhaust gas flow.

The guide member may include a continuously surrounding peripheral wall. It is likewise conceivable that the guide member lines only a partial region of the feed connector with respect to the periphery, such as, e.g., a region that is especially susceptible to deposits.

In addition, the guide member may include one or more openings in its peripheral wall, through which the gas flow is guided into that region of the feed connector which is inside with respect to the guide member. Here, the use of a porous material is also conceivable. The guide member may, of course, also be designed without any openings, i.e. closed, in particular if it is made rather short.

The device is preferably configured such that the gas flow is formed as a swirl flowing in the feed connector, something which enhances the mixing in the feed connector. This swirling of the gas flow in the feed connector may be attained by a suitably designed and arranged guide member and/or an oblique inlet opening.

More specifically, the feed connector is arranged at an angle of from 20° to 70° in relation to the exhaust pipe, which results in a particularly favorable distribution of the reducing agent supplied.

For a better mixing of the supplied reducing agent with the exhaust gas flow, a mixing element for causing a swirling of the exhaust gas flow is advantageously arranged in the exhaust pipe downstream of the feed connector.

The exhaust pipe may have a bend of approx. 20° to 70° in the region of the feed connector. Preferably, the bend of the exhaust pipe roughly corresponds to the angle between the exhaust pipe and the feed connector. It is also possible to arrange the feed connector on a section of the exhaust pipe extending in a straight line.

As already mentioned at the outset, the reducing agent more particularly is an aqueous urea solution or a solution of other substances releasing ammonia. The invention can, however, also be employed to advantage when fuel is used as the reducing agent.

A particularly cost-effective configuration is obtained in that the feed device is an injection valve, in particular a low-pressure fuel injection valve.

According to a second aspect of the invention, a method of introducing a reducing agent into the exhaust pipe of an exhaust system of an internal combustion engine, in particular of a motor vehicle, is provided. The method according to the invention includes the following steps:

generating a gas flow which is additional to the reducing agent flow and is at least largely free of reducing agent and lines a wall of a feed connector opening into the exhaust pipe;

injecting the reducing agent by means of a feed device arranged on the feed connector.

As already discussed in relation to the assembly according to the invention, the reducing agent deposits occurring in the prior art are effectively prevented by the method according to the invention as well.

BRIEF DESCRIPTIONS OF THE DRAWINGS

Further features and advantages of the invention will be apparent from the following description of several preferred embodiments with reference to the accompanying drawings, in which:

FIG. 5 shows a sectional view of an assembly according to the prior art, which illustrates the problem underlying the invention;

FIG. 6 shows a sectional view of an assembly according to a fifth embodiment of the invention;

FIG. 7 shows a sectional view on the feed connector according to the line VII-VII in FIG. 6.

DETAILED DESCRIPTION

Figure 1:
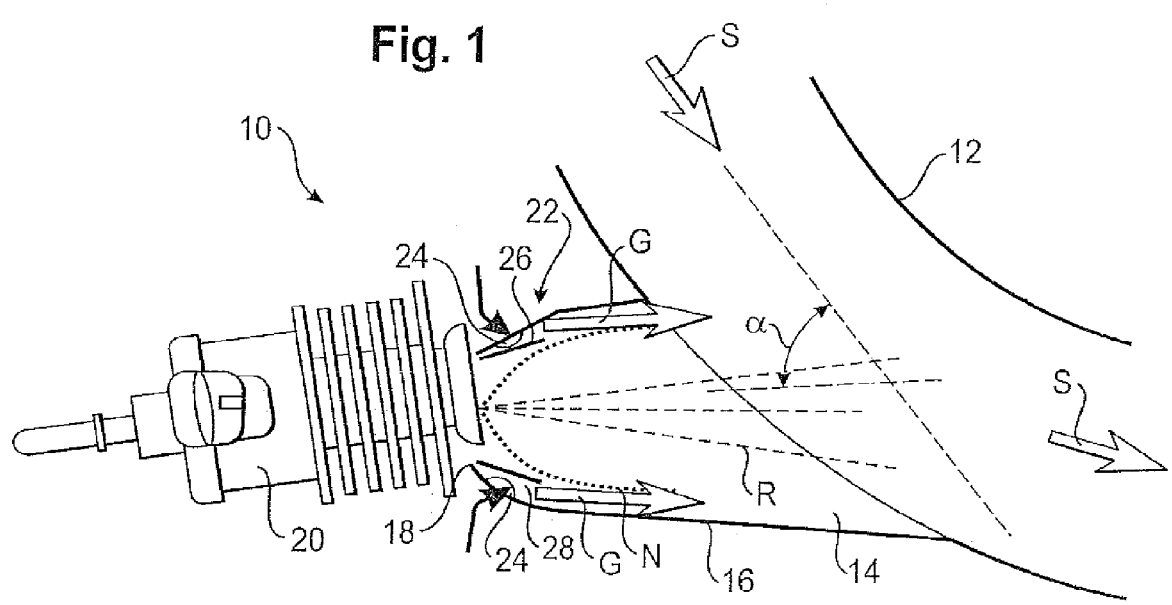
FIG. 1 shows a schematic sectional view of an assembly according to a first embodiment of the invention for carrying out the method according to the invention.

FIG. 1 schematically shows an assembly 10 according to the invention for introducing a reducing agent into an exhaust pipe 12 of an exhaust system of an internal combustion engine. In particular, the exhaust system of a motor vehicle is involved. The exhaust gas flow in the exhaust pipe 12 is denoted by S. The assembly 10 includes a feed connector 14 which is of a substantially conical configuration and opens into the exhaust pipe 12, preferably at an angle a of between 20° and 70° here approx. 55° The (inside) wall of the feed connector 14 bears the reference number 16.

Arranged in a mount 18 provided at the end of the feed connector 14 that is opposite to the exhaust pipe 12 is a feed device 20 for reducing agents, which opens into the feed connector 14 and which is an injection valve, in this case a low-pressure fuel injection valve. The reducing agent preferably is an aqueous urea solution which is introduced into the exhaust pipe 12 upstream of an SCR catalytic converter not shown in FIG. 1. Departing from the configuration shown, it is not absolutely necessary to provide a mount for the feed device 20; the latter may also be welded to the feed connector, for example. To avoid urea deposits D when the urea solution is introduced, as occur in feed devices 20 according to the prior art and are schematically shown in FIG. 5, the assembly 10 according to the invention (FIG. 1) includes a device 22 which serves to 10 generate a gas flow G that is additional to the reducing agent flow R and lines the wall 16 of the feed connector 14.

The device 22 comprises of at least one, in the present case a plurality of inlet openings 24 arranged in the wall 16 for the gas flow G which involves fresh air, more particularly compressed air, or else exhaust gas which is branched off of the feed connector 14. The device 22 furthermore comprises a guide member 26 arranged in the feed connector 14.

To feed the ammonia required for nitrogen oxide reduction to an SCR catalytic converter connected downstream of the assembly 10, according to the invention a gas flow G additional to the reducing agent flow R is generated in the region of the feed connector 14, the additional gas flow G being at least largely free of reducing agent and annularly lining the wall 16 of the feed connector. To this end the gas flow G enters through the openings 24 into the feed connector 14 and is deflected by the guide member 26, so that the gas flow G flows along the wall 16 of the feed connector 14 and practically covers the wall 16 from the reducing agent flow R. At the same time, the reducing agent is injected into the feed connector 14 and thereby into the exhaust pipe 12 with the aid of the feed device 20, the guide member 26 directing the gas flow G such that the reducing agent flow R is, as it were, sheathed, and in this way preventing the fine mist of urea N developing at the tip of the feed device 20 from being able to deposit on the wall 16 or on a wall of the exhaust pipe 12.

Figure 2:
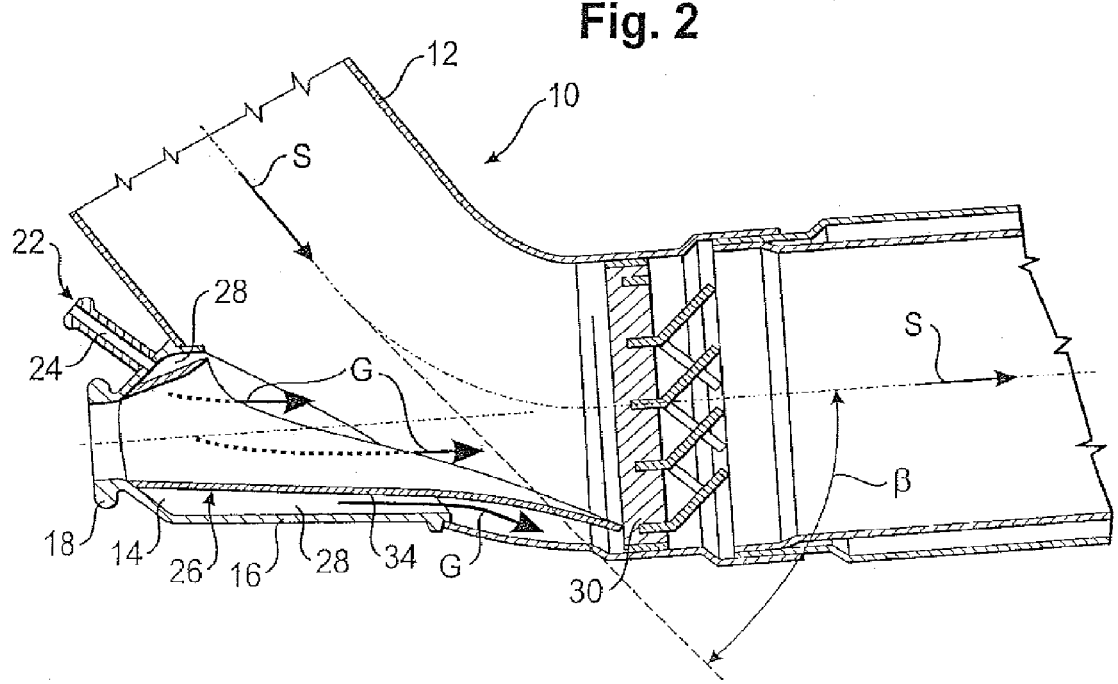
FIG. 2 shows a sectional view of an assembly according to a second embodiment of the invention.
Figure 3:
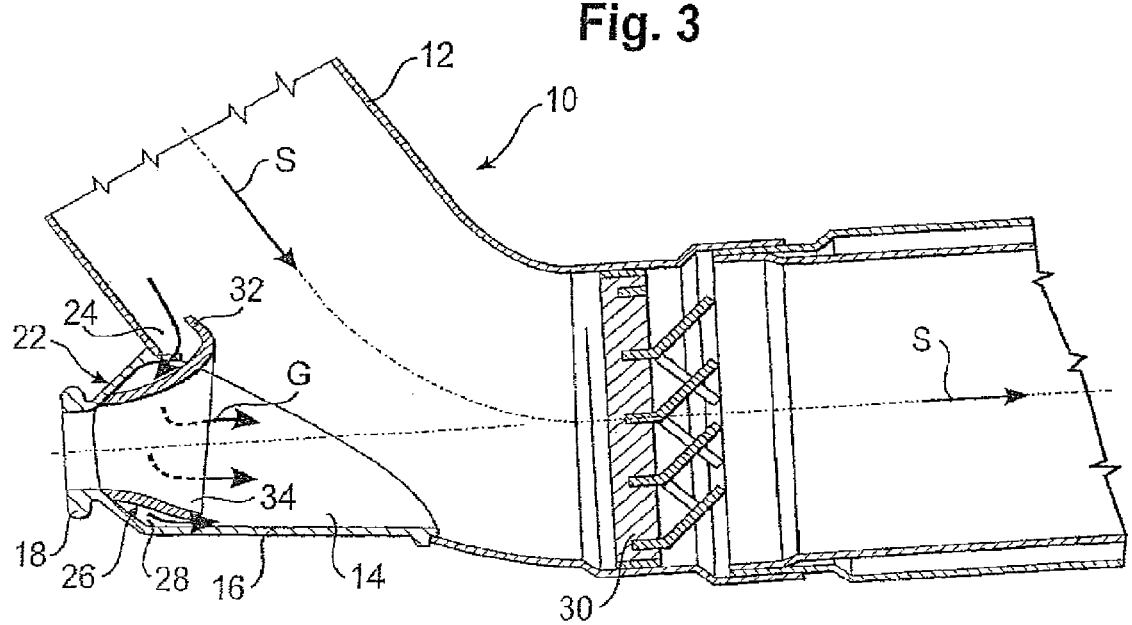
FIG. 3 shows a sectional view of an assembly according to a third embodiment of the Invention.
Figure 4:
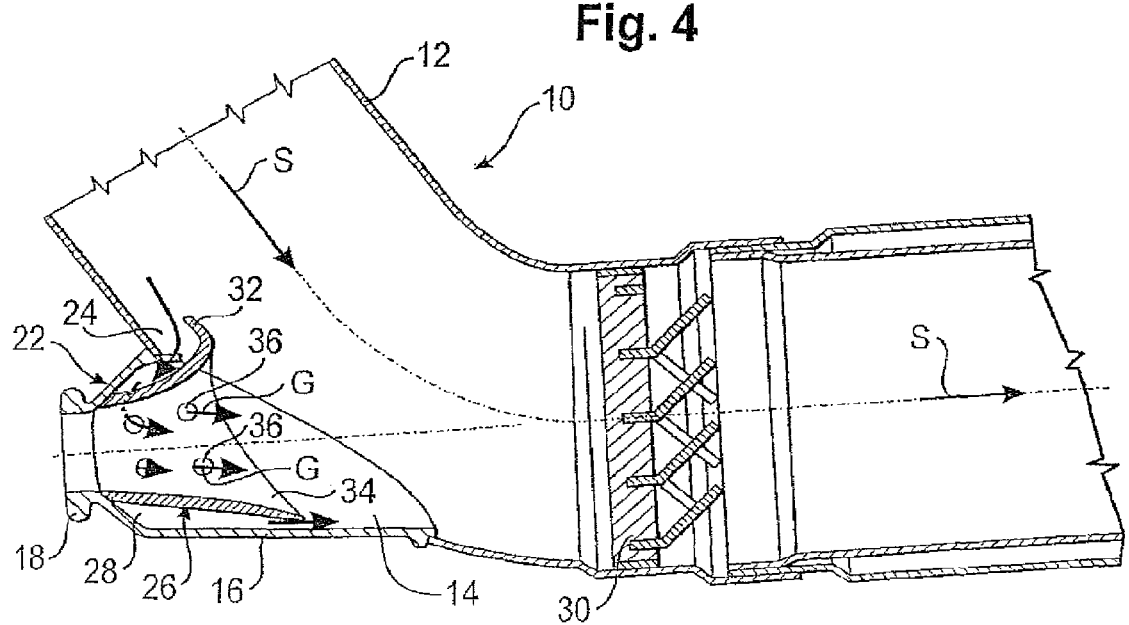
FIG. 4 shows a sectional view of an assembly according to a fourth embodiment of the Invention.

FIGS. 2 to 4 show further embodiments of the assembly 10 according to the invention that are modified as compared with FIG. 1. Identical or functionally identical components will be denoted by the same reference numbers below, and only the differences from the assembly 10 described so far will be discussed.

In the embodiment according to FIG. 2, only one inlet opening 24 is provided, which is again arranged in the wall 16 of the feed connector 14 and is in fluid communication with a compressed air pipe of the vehicle or with the exhaust pipe upstream of a turbocharger or upstream of the reducing agent injection. The gas flow G flows through the inlet opening 24 and reaches a gap 28 formed between the wall 16 and the guide member 26. In the embodiment shown, the guide member 26 extends from the mount 18 for the feed device 20 (not shown here) along the wall 16 of the feed connector 14 and lines the wall 16. Just like the feed connector 14, the guide member 26 has a conical shape, but, compared with the region of the feed connector 14 close to the mount 18, it has a smaller opening angle towards the orifice into the exhaust pipe 12. In the embodiment shown, the guide member 26 extends over the entire length of the feed connector 14 and in the lower, downstream region even partly into the exhaust pipe 12, here up to a static mixing element 30 arranged downstream of the feed connector 14, the guide member 26 serving as a heated wall which (in addition to directing the gas flow G) favors a vaporization of any deposits.

In the region of the feed connector 14, the exhaust pipe 12 has a bend the angle β of which likewise amounts to between 20° and 70°, here 55°. Owing to the bend of the exhaust pipe 12 and the angled arrangement of the feed connector 14 in relation to the exhaust pipe 12, the reducing agent flow R flows roughly perpendicularly against the mixing element 30. The feed connector 14 may, of course, also be arranged on a section of the exhaust pipe 12 extending in a straight line (not shown).

FIG. 3 shows a further embodiment of the assembly 10 according to the invention, in which the guide member 26 (as in the embodiment shown in FIG. 1) is of a comparatively short configuration and extends only partly along the wall 16 of the feed connector 14 (at least in the lower, downstream region). On that side of the orifice of the feed connector 14 into the exhaust pipe 12 that is upstream in relation to the exhaust gas flow S, a bent section 32 of the guide member 26 extends into the exhaust pipe 12 and thereby defines an inlet opening 24 which directs part of the exhaust gas flow S into the feed connector 14 or into the gap 28 between the guide member 26 and the wall 16. The inlet opening 24 is thus formed in the region of the orifice of the feed connector 14 into the exhaust pipe 12 here. A separate inlet opening 24 for the gas flow G is not necessary, as a result of which a particularly simple design is obtained. As with the other embodiments shown so far, the guide member 26 has a closed peripheral wall 34.

As shown in FIG. 4, the guide member 26 may also have a plurality of openings 36 in its peripheral wall 34 to guide the gas flow G into the region of the feed connector 14 that is inside with respect to the guide member 26. Also conceivable is the use of a porous material to manufacture the guide member 26.

Figure 8:
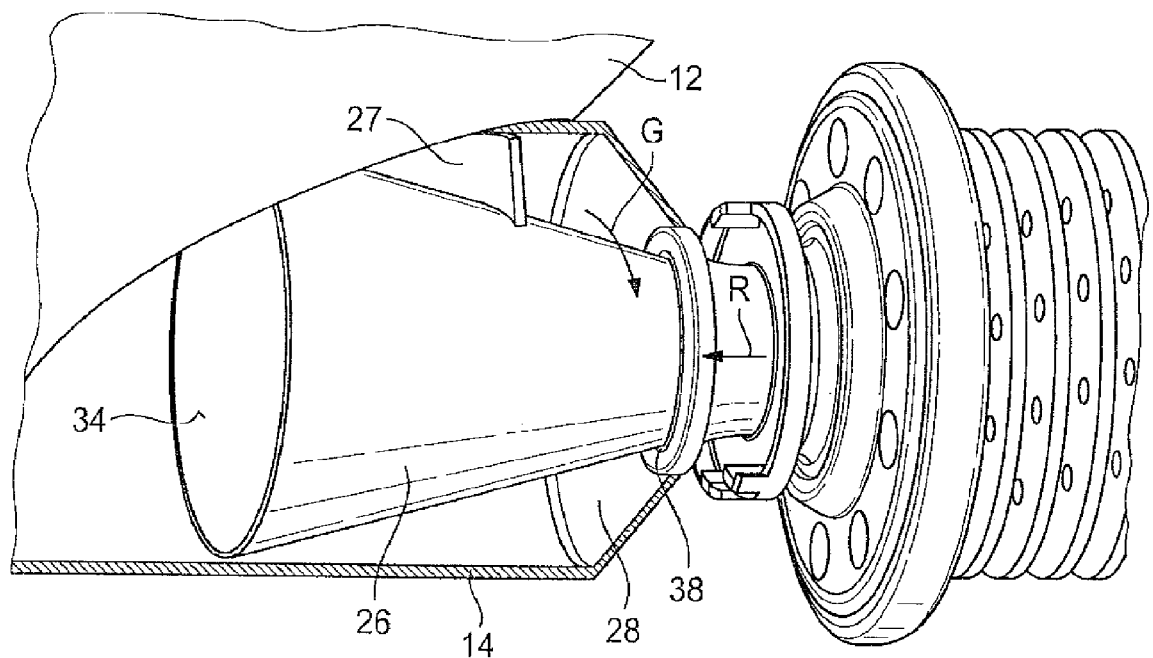
FIG. 8 shows an enlarged side view of the assembly according to the fifth embodiment, with the feed connector partly cut open.

According to the embodiment as shown in FIGS. 6 to 8, the device is configured in such a way that the gas flow G is in the form of a swirl flowing in the feed connector 14, something which enhances the mixing of the reducing agent R in the gas flow G as early as in the feed connector 14. This swirling of the gas flow G in the feed connector 14 may be attained by a suitably configured and arranged guide member 26 and/or an oblique inlet opening. In the embodiment illustrated, the inlet opening 24 into the gap 28 is positioned so as to be eccentric (see FIG. 7), so that a swirl is already formed in the gap 28 which then impinges as such on the reducing agent R via an annular opening 38 between the beginning of the guide member 26 and the beginning of the connector 14. As seen in FIG. 8, attached to the guide member 26 is a helically bent, short deflection part 27 which is located between the guide member 26 and the feed connector 14 to direct the gas around the conical guide member 26 towards the annular opening 38. The deflection part 27 is to be considered a section of the guide member 26. The gas for one thing mixes with the reducing agent R and, for another thing, comes to lie against the inside of the tubular guide member 26, likewise in the form of a swirl. In this embodiment the guide member 26 is connected with the feed connector 14 at some points (not shown).

The assembly 10 is an apparatus that includes an exhaust pipe 12, a feed connector 14, and a guide member 26 as suggested in FIG. 6. The exhaust pipe 12 is formed to include an exhaust passageway 121 that is adapted to conduct an exhaust gas S to a downstream catalytic converter as suggested in FIG. 6. The exhaust pipe 12 is formed to include a side aperture 122 opening into the exhaust passageway 121 as suggested in FIG. 6.

The feed connector 14 is formed to include a feed-connector channel 141 and the guide member 26 is positioned to lie in and extend through the feed-connector channel 141 as suggested in FIG. 6. The feed connector 14 includes an inlet end 142 formed to include an inlet aperture 143 adapted to receive a flow of reducing agent R comprising an aqueous urea solution from a reducing agent source as disclosed herein, an outlet end 144 formed to include an outlet aperture 145 and coupled to the exhaust pipe 12 to cause the outlet aperture 145 to open into the exhaust passageway 121, and an inner surface 146 arranged to extend from the inlet end 142 to the outlet end 144 to define a feed-connector channel 141 extending from the inlet end 142 to the outlet end 144 as suggested in FIG. 6.

The guide member 26 is arranged to lie in the feed-connector channel 141 formed in the feed connector 14 as suggested in FIG. 6. The guide member 26 is configured to provide means for communicating the flow of reducing agent R passing through the inlet aperture 143 of the feed connector 14 into the exhaust passageway 121 via a reducing-agent passageway 261 to combine with exhaust gas S flowing through the exhaust passageway 121 in a downstream direction toward the catalytic converter as described herein and as suggested in FIG. 6. The guide member 26 includes an inner surface 262 that defines the reducing-agent passageway 261 as suggested in FIG. 6. The guide member 26 also includes an outer surface 263 that is arranged to cooperate with a surrounding portion of the inner surface 146 of the feed connector 14 to define therebetween a gap 28 as suggested in FIG. 6.

The assembly 10 also includes an opening 38, which in some embodiments may be annular, defined between a beginning of the guide member 26 where the reducing agent R enters the reducing-agent passageway 261 and an inlet end 142 of the feed connector 14 where the reducing agent R enters the feed-connector channel 141 as suggested in FIG. 6. The opening 38 is in fluid communication with the gap 28 so that the flow of exhaust gas G admitted into the gap 28 is conducted through the gap 28 and into the reducing-agent passageway 261 when the apparatus 10 is used in an exhaust system of an internal combustion engine as described herein and as suggested in FIG. 6.

The gap 28 is configured to provide means for causing a flow of exhaust gas G admitted from an upstream site in the exhaust passageway 121 to swirl around the outer surface 263 of the guide member 26 and enter the reducing-agent passageway 261 as described herein and suggested in FIG.

6. The flow of exhaust gas G conducted in the gap 28 is at least largely free of reducing agent R during operation of the apparatus and annularly lines the inner surface 146 of the feed connector 14 as described herein and as suggested in FIG. 6.

The guide member 26 includes a peripheral wall 34 that lines at least a partial region of the feed connector 14 and provides the outer surface 263 of the guide member 26 and the inner surface 262 of the guide member 26 as suggested in FIG. 6. The peripheral wall 34 is closed and formed without openings to admit gas flow into the reducing-agent passageway 261 as suggested in FIG. 6. The peripheral wall 34 has a conical shape and flares outwardly as the guide member 26 extends from the beginning of the peripheral wall 34 where reducing agent R comprising aqueous solution enters the guide member 26 as suggested in FIG. 6. The feed connector 14 and guide member 26 are configured in such a way that a swirl flowing in the feed connector 14 is induced and enhances the mixing of the reducing agent R in the gas flow as described herein and suggested in FIG. 6.

The assembly 10 also includes a feed device 20 configured to discharge the reducing agent R under pressure through the inlet aperture 143 formed in the inlet end 142 of the feed connector 14 into the reducing-agent passageway 261 to establish the flow of reducing agent R as described herein and as suggested in FIG. 6. The feed device 20 is located in spaced-apart relation to the exhaust pipe 12 to locate the feed connector 14 therebetween as suggested in FIG. 6. The feed device 20 is located outside of the exhaust passageway 121 formed in the exhaust pipe 12 as suggested in FIG. 6.

The assembly according to the invention provides a solution that Is simple to manufacture and therefore cost-effective, for avoiding any undesirable reducing agent deposits when a reducing agent Is introduced into the exhaust pipe of an exhaust system.

In addition, it is at the discretion of a person skilled in the art to employ all of the features described above both individually and in combination with each other to achieve the object of the invention.

The invention claimed is:

1. A reducing agent injection apparatus for use in ai exhaust system with a catalytic converter, the apparatus comprising
an exhaust pipe formed to include an exhaust passageway adapted to conduct an exhaust gas to the catalytic converter and formed to include a side aperture opening into the exhaust passageway,
a feed connector arranged to extend through the side aperture into the exhaust passageway of the exhaust pipe, the feed connector upstream of the catalytic converter and formed to include (i) an inlet end formed to include an inlet aperture adapted to receive a flow of reducing agent comprising an aqueous urea solution, (ii) an outlet end, and (iii) an inner surface arranged to extend from the inlet end to the outlet end to define a feed-connector channel extending from the inlet end to the outlet end, and
a guide member arranged in the feed-connector channel and configured to communicate the flow of reducing agent passing through the inlet aperture of the feed connector into the exhaust passageway via a reducing-agent passageway to combine at a downstream site in the exhaust passageway with exhaust gas flowing through the exhaust passageway in a downstream direction toward the catalytic converter,
wherein the guide member includes an inner surface arranged to define the reducing-agent passageway and an outer surface arranged to cooperate with a surrounding portion of an inner surface of the feed connector to define therebetween a gap configured to conduct a flow of exhaust gas admitted from an upstream site in the exhaust passageway to swirl around the outer surface of the guide member and enter the reducing-agent passageway.

2. The apparatus of claim 1, wherein the guide member includes a peripheral wall that provides the outer surface of the guide member and the inner surface of the guide member and the peripheral wall lines at least a partial region of the feed connector.

3. The apparatus of claim 2, wherein an annular opening is formed between a beginning of the guide member where the reducing agent enters the reducing-agent passageway and the inlet end of the feed connector where the reducing agent enters the feed-connector channel.

4. The apparatus of claim 3, wherein the peripheral wall is closed and is formed without openings to admit gas flow into the reducing-agent passageway.

5. The apparatus of claim 1, wherein an inlet opening is formed between a beginning of the guide member where the reducing agent enters the reducing-agent passageway and the inlet end of the feed connector where the reducing agent enters the feed-connector channel.

6. The apparatus of claim 5, wherein the guide member includes a peripheral wall that has a conical shape, the peripheral wall lines at least a partial region of the feed connector, and the peripheral wall flares outwardly as the guide member extends from the beginning where the reducing agent enters the guide member.

7. The apparatus of claim 1, further comprising a feed device configured to discharge the reducing agent under pressure through the inlet aperture formed in the inlet end of the feed connector into the reducing-agent passageway to establish the flow of reducing agent, wherein the feed device is located in spaced-apart relation to the exhaust pipe to locate the feed connector therebetween.

8. The apparatus of claim 7, wherein the feed device is located outside of the exhaust passageway formed in the exhaust pipe.

9. The apparatus of claim 1, wherein the flow of exhaust gas conducted in the gap is at least largely free of reducing agent and annularly lines the inner surface of the feed connector during operation of the apparatus.

10. The apparatus of claim 1, wherein the guide member includes a closed peripheral wall that has a conical shape and the closed peripheral wall lines a partial region of the feed connector.

11. The apparatus of claim 10, wherein the feed connector and guide member are configured in such a way that a swirl flowing in the feed connector is induced and enhances the mixing of the reducing agent in the gas flow.

12. A reducing agent injection apparatus for use exhaust system with a catalytic converter, the apparatus comprising
an exhaust pipe formed to include an exhaust passageway adapted to conduct; exhaust gas to the catalytic converter and formed to include a side aperture opening into exhaust passageway,
a feed connector arranged to extend through the side aperture into the exhaust passageway of the exhaust pipe, the feed connector upstream of the catalytic converter and formed to include an inlet end formed to include an inlet aperture adapted to receive a flow of reducing agent comprising an aqueous urea solution, an outlet end, and an inner surface arranged to extend from the inlet end to the outlet end to define a feed-connector channel extending from the inlet end to the outlet end, and a guide member arranged in the feed-connector channel and configured t communicate a flow of reducing agent passing through the inlet aperture of the feed connection into the exhaust passageway via a reducing-agent passageway, the guide member including a peripheral wall having an inner surface arranged to define the reducing-agent passageway am outer surface arranged to cooperate with a surrounding portion of an inner surface of the feed connector to define therebetween a gap configured to admit a flow of exhaust gas from an upstream site in the exhaust passageway, wherein an annular opening is formed between a beginning of the guide member where the reducing agent enters the reducing-agent passageway and the inlet end of the feed connector where the reducing agent enters the feed-connector channel, and wherein the annular opening is in fluid communication with the gap so that ex flow admitted into the gap is conducted through the gap and into the reducing-agent passageway when the apparatus is used in an exhaust system of an internal combustion engine.

13. The apparatus of claim 12, wherein the peripheral wall is closed and is formed without openings to admit gas flow into the reducing-agent passageway.

14. The apparatus of claim 13, wherein the peripheral wall flares outwardly as the guide member extends from the beginning where the reducing agent enters the guide member.

15. The apparatus of claim 12, further comprising a feed device configured to discharge reducing agent under pressure through the inlet aperture formed in the inlet end of the feed connector into the reducing-agent passageway to establish the flow of reducing agent, wherein the feed device is located in spaced-apart relation to the exhaust pipe to locate the feed connector therebetween.

16. The apparatus of claim 15, wherein the feed device is located outside of the exhaust passageway formed in the exhaust pipe.

17. The apparatus of claim 12, wherein the peripheral wall of the guide member is closed and has a conical shape.

18. A reducing agent injection apparatus for use in an exhaust system with a catalytic converter, the apparatus comprising an exhaust pipe that defines an exhaust passageway and that is formed to include side aperture opening into the exhaust passageway, a feed connector arranged to extend through the side aperture into the exhaust passageway of the exhaust pipe, the feed connector upstream of the catalytic converter and formed to include (i) an inlet end, (ii) an outlet end, and (iii) an inner surface arranged to extend from the inlet end to the outlet end to define a feed-connector channel extending from the inlet end to the outlet end, a feed device configured to discharge reducing agent under pressure through an inlet aperture formed in the inlet end of the feed connector to establish a flow of reducing agent comprising an aqueous urea solution and a guide member arranged in the feed-connector channel and configured to com the flow of reducing agent passing through the feed connector into the exhaust passageway via reducing-agent passageway, wherein the guide member includes an inner surface arranged to define the reducing-agent passageway and an outer surface arranged to cooperate with a surrounding portion of an inner surface of the feed connector to define therebetween a gap configured to conduct a flow of exhaust gas admitted from the exhaust passageway to move around the outer surface of the guide member and enter the reducing-agent passageway.

19. The apparatus of claim 18, wherein an annular opening is formed between a beginning of the guide member where the reducing agent enters the reducing-agent passageway and the inlet end of the feed connector where the reducing agent enters the feed-connector channel.

20. The apparatus of claim 18, wherein the flow of exhaust gas conducted in the gap is at least largely free of reducing agent.

* * * * *